(12) United States Patent
Jacquemet et al.

(10) Patent No.: US 12,234,360 B2
(45) Date of Patent: Feb. 25, 2025

(54) REDUCING HYGROSCOPICITY OF A MINERAL MATERIAL

(71) Applicant: COATEX, Genay (FR)

(72) Inventors: Christian Jacquemet, Lyons (FR); Jacques Mongoin, Quincieux (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 749 days.

(21) Appl. No.: 17/424,700

(22) PCT Filed: Feb. 24, 2020

(86) PCT No.: PCT/FR2020/000041
§ 371 (c)(1),
(2) Date: Jul. 21, 2021

(87) PCT Pub. No.: WO2020/174132
PCT Pub. Date: Sep. 3, 2020

(65) Prior Publication Data
US 2022/0081569 A1    Mar. 17, 2022

(30) Foreign Application Priority Data
Feb. 26, 2019   (FR) .................................... 1901932

(51) Int. Cl.
| | | |
|---|---|---|
| C09C 1/02 | (2006.01) | |
| C09C 3/00 | (2006.01) | |
| C09C 3/04 | (2006.01) | |
| C09C 3/08 | (2006.01) | |
| C09C 3/10 | (2006.01) | |

(52) U.S. Cl.
CPC .............. *C09C 1/021* (2013.01); *C09C 3/006* (2013.01); *C09C 3/041* (2013.01); *C09C 3/043* (2013.01); *C09C 3/08* (2013.01); *C09C 3/10* (2013.01); *C01P 2004/61* (2013.01); *C01P 2004/62* (2013.01); *C01P 2006/12* (2013.01)

(58) Field of Classification Search
CPC ......... C09C 1/021; C09C 3/006; C09C 3/041; C09C 3/043; C09C 3/08; C09C 3/10
See application file for complete search history.

(56) References Cited

U.S. PATENT DOCUMENTS

| | | |
|---|---|---|
| 2004/0077762 A1 | 4/2004 | Mongoin et al. |
| 2005/0234176 A1 | 10/2005 | Mongoin et al. |
| 2006/0287423 A1* | 12/2006 | Michl .................. C01F 11/185 524/425 |
| 2014/0088250 A1 | 3/2014 | Suau et al. |
| 2015/0284555 A1 | 10/2015 | Suau et al. |

FOREIGN PATENT DOCUMENTS

| | | |
|---|---|---|
| WO | WO 02/49765 A2 | 6/2002 |
| WO | WO 2014/049252 A1 | 4/2014 |
| WO | WO 2018/109400 A1 | 6/2018 |

OTHER PUBLICATIONS

International Search Report issued on Aug. 13, 2020 in PCT/FR2020/000041 filed on Feb. 24, 2020, 2 pages.

* cited by examiner

*Primary Examiner* — John E Uselding
(74) *Attorney, Agent, or Firm* — Oblon, McClelland, Maier & Neustadt, L.L.P.

(57) ABSTRACT

A method for reducing the hygroscopicity of a material (M) including calcium carbonate may include treating the calcium carbonate with at least one homopolymer grinding assistant (P) which is neutralized in a particular way. A method for producing such a material (M) including calcium carbonate may include treating the calcium carbonate with at least one homopolymer grinding assistant (P) to provide such a material (M), which is then of reduced hygroscopicity. Such a calcium carbonate may be used as a filler in polymeric plastics.

19 Claims, No Drawings

REDUCING HYGROSCOPICITY OF A MINERAL MATERIAL

CROSS-REFERENCE TO RELATED APPLICATIONS

The present application is the national stage of international application PCT/FR2020/000041, filed on Feb. 24, 2020, and claims the benefit of the filing date of French Appl. No. 1901932, filed on Feb. 26, 2019.

The invention relates to the field of calcium carbonate-based materials and in particular their use as fillers in plastic polymer materials. The invention provides a method for reducing the hygroscopicity of a material (M) comprising calcium carbonate by treating it with at least one homopolymer-based grinding aid (P) that is neutralised in a particular way. The invention also relates to a method for packaging this material (M) which then has reduced hygroscopicity.

In the field of plastic polymer materials, and particularly of polyolefin resins, it is important to be able to have alternative preparation methods, in particular methods that make it possible to reduce the amounts of polymers used. It is thus possible to substitute a portion of these polymers by filler materials when preparing plastic polymer materials.

These filler materials must have special properties to be able to be used in these preparation methods. In particular, these filler materials must be highly compatible with the polymers with which they are combined.

These filler materials must not cause any degradation of the properties of the plastic polymer materials into which they are incorporated, for example degradation of the mechanical or optical properties of these materials. These filler materials must not disrupt the methods used to prepare the plastic polymer materials into which they are incorporated.

In particular, these filler materials must have improved properties in the presence of moisture. They must in particular have improved hygroscopicity, particularly reduced hygroscopicity. These materials must therefore have a reduced capacity to absorb the moisture present in their environment, in particular when they are being prepared or when they are being used in the preparation of plastic polymer materials, particularly during their storage or their use in the preparation of polyolefin resins.

These filler materials are generally materials of mineral origin. They can in particular be chosen among materials comprising calcium carbonate.

These materials comprising calcium carbonate are used in the form of particles that are prepared chemically or by grinding and dispersing mineral materials, in particular by wet grinding. The methods for preparing these filler materials must therefore also be improved in order to be implemented at high solid contents while enabling filler materials with improved final properties to be obtained. Viscosity control during the various steps in the preparation of these filler materials is also a desired feature.

Grinding aid agents or dispersing agents are usually used when implementing these methods for preparing filler materials.

However, the methods used in the prior art continue to cause problems, in particular the grinding aid agents or dispersing agents used.

It is therefore important to be able to have improved methods and means for preparing and using these filler materials in plastic polymer materials.

Document WO 2014/049252 describes a method for preparing a (meth)acrylic acid polymer with a molecular mass of less than 8,000 g/mol in the presence of a combination of a disulphide compound and of a polymerisation initiator system. Document WO 02/49765 discloses the use of (meth)acrylic acid homopolymers or copolymers and of one or more acrylic, vinyl or allyl monomers as a dispersing agent or as an aid for grinding mineral material in an aqueous suspension. Document WO 2018/109400 also relates to grinding a mineral material in the presence of water and in the presence of at least one (meth)acrylic acid polymer prepared in the presence of sodium hypophosphite and of disodium 2,2'-(thiocarbonylbisthio)dipropanoate.

The invention relates to a method for treating a material that makes it possible to provide a solution to all or part of the problems of the methods used in the prior art.

Thus, the invention provides a method for reducing the hygroscopicity of a material (M) comprising calcium carbonate and intended to be used in a polymeric material, comprising the treatment of the material (M) with at least one homopolymer-based grinding aid (P)
 prepared by polymerisation reaction of a compound chosen among acrylic acid, an acrylic acid salt, methacrylic acid and a methacrylic acid salt, and of which:
  the molecular mass $M_w$ (measured by SEC) ranges from 3,000 to 5,000 g/mol,
  the polymolecularity index ($_{PI}$) ranges from 1.5 to 2.9, and
  the carboxylic acid groups are partially or totally neutralised by:
   70 mol % of $Na^+$ and
   from 10 to 30 mol % of at least one cation chosen among $Na^+$, $K^+$, $Li^+$ and combinations thereof.

Preferably, the method according to the invention comprises:
 A. the preparation of an aqueous suspension of the material (M) comprising:
  A1. water,
  A2. at least one material (M),
  A3. at least one homopolymer (P),
 B. wet grinding of the material (M) in the aqueous suspension,
 C. partial separation of the water from the aqueous suspension comprising the ground material (M).

According to the invention, during the preparation (A) of the aqueous suspension of the material (M), various procedures can be implemented separately or in combination.

Thus, this suspension can be prepared by simultaneously mixing the water, the material (M) and the homopolymer (P).

It is also possible to mix the water and the material (M) separately and then to add the homopolymer (P).

It is also possible to mix the water and the homopolymer (P) separately and then to add the material (M).

Lastly, it is also possible to mix the material (M) and the homopolymer (P) separately and then to add the water.

Preferably according to the invention, the method comprises:
 D. drying the suspension of the ground material (M) and optionally
 E. treating the ground and dried material (M) with at least one hydrophobising agent.

Thus, the implementation of the method according to the invention makes it possible to confer specific properties on the material (M) that are particularly useful when using the material (M) thus packaged. The invention thus also provides a method for packaging a filler material (M) for plastic polymer, comprising calcium carbonate and having a low sensitivity to moisture. The packaging method according to the invention comprises the treatment of the material (M)

with at least one homopolymer-based grinding aid (P) prepared by polymerisation reaction of a compound chosen among acrylic acid, an acrylic acid salt, methacrylic acid and a methacrylic acid salt, and of which:

the molecular mass $M_W$ (measured by SEC) ranges from 3,000 to 5,000 g/mol, the polymolecularity index (PI) ranges from 1.5 to 2.9, and the carboxylic acid groups are partially or totally neutralised by:

70 mol % of $Na^+$ and from 10 to 30 mol % of at least one cation chosen among $Na^+$, $K^+$, $Li^+$ and combinations thereof.

The preferred, particular or advantageous characteristics of the method for reducing the hygroscopicity of a material (M) according to the invention define packaging methods according to the invention that are also preferred, particular, or advantageous.

Preferably according to the invention, the material (M) comprising calcium carbonate is chosen among marble, limestone, chalk, dolomite, mixtures thereof and combinations thereof. The calcium carbonate used according to the invention can therefore be of natural origin but also of synthetic origin. Preferably, the calcium carbonate of synthetic origin (PCC) is chosen among vaterite, calcite aragonite, mixtures thereof and combinations thereof.

Preferably according to the invention, the ground material (M) has a median particle diameter $d_{50}$ by weight (determined by settling) of from 0.1 to 3 µm, preferably of from 0.1 to 2.8 µm, more preferentially of from 0.4 to 2.6 µm, much more preferentially of from 0.6 to 2.5 µm. Also preferably according to the invention, the ground material (M) has a specific surface area, measured using the BET method in accordance with standard ISO 9277 (2010), ranging from 1 to 50 $m^2/g$, preferentially from 2 to 20 $m^2/g$ and more preferentially from 3 to 10 $m^2/g$.

Also preferably, the aqueous suspension in step (A) comprises from 40 to 78% by weight, preferably from 50 to 70% by weight, of material (M).

According to the invention, step (B) in which the suspension (M) prepared in step (A) is ground is followed by the separation step (C) that makes it possible to increase the content by weight of ground material (M) relative to the amount by weight of suspension. Thus, and also preferably, the aqueous suspension obtained after separation (C) comprises at least 74% by weight, preferably at least 76% by weight, of ground material (M) relative to the amount by weight of suspension. More preferentially, the aqueous suspension obtained after separation (C) comprises at least 78% by weight, in particular from 74 to 83% by weight or from 76 to 83% by weight or even from 78 to 83% by weight, of ground material (M) relative to the amount by weight of suspension.

Essentially, the invention comprises the use of at least one homopolymer (P). Preferably, the carboxylic acid groups of the homopolymer (P) are partially neutralised. More preferably, the neutralisation is carried out using $Na^+$. Much more preferentially, the carboxylic acid groups of the homopolymer (P) are partially neutralised to at least 80 mol % by $Na^+$, much more preferentially neutralised to at least 90 mol % by $Na^+$ or neutralised to 100 mol % by $Na^+$. Also preferably, when the carboxylic acid groups of the copolymer (P) are partially neutralised by at least 80 mol % by $Na^+$, the other carboxylic acid groups of the copolymer (P) are in free acid form or are partially neutralised by at least one cation chosen among $K^+$, $Li^+$ and combinations thereof.

The method according to the invention also comprises wet grinding of the material (M) in the aqueous suspension prepared beforehand. Preferably, the grinding (B) is carried out in the presence of from 0.05 to 0.5% by weight of homopolymer (P) relative to the amount by weight of material (M). Also preferably, the grinding (B) is carried out in the presence of from 0.08 to 0.4% by weight of homopolymer (P) relative to the amount by weight of material (M). More preferentially, the grinding (B) is carried out in the presence of from 0.1 to 0.3% by weight of homopolymer (P) relative to the amount by weight of material (M).

Much more preferentially, the grinding (B) is carried out in the presence of from 0.12 to 0.2% by weight of homopolymer (P) relative to the amount by weight of material (M).

Also preferably, the partial separation (C) of the water from the aqueous suspension is carried out by at least one means chosen among a mechanical means, a thermal means; preferably by a thermal means, optionally under vacuum or optionally combined with a means of suction. More preferably, the partial separation (C) of the water from the aqueous suspension is carried out by at least one thermal means.

Also preferably, the ground material (M) is dried by at least one means chosen among a spray-drying means, a lyophilisation means, a spraying means, a rotary kiln, a heating strip, a means of air-pulsed heating, a fluidised bed, a means of fluidised lyophilisation and a means of nozzle-drying. More preferably, the ground material (M) is dried by at least one spraying means.

According to the invention, the ground and dried material (M) is treated with at least one hydrophobising agent. Preferably, the hydrophobising agent is chosen among a carboxylic acid, preferably an aliphatic carboxylic acid, in particular a $C_4$-$C_{24}$-aliphatic carboxylic acid. Particularly preferably, the hydrophobising agent is an aliphatic monocarboxylic acid, in particular a $C_4$-$C_{24}$-aliphatic monocarboxylic acid. Stearic acid is the preferred hydrophobising agent.

The hydrophobising agent can also be chosen among a succinic acid anhydride derivative mono-substituted by a straight, branched or cyclic $C_2$-$C_{30}$-alkyl group, and a reaction product of such a derivative.

The hydrophobising agent can also be chosen among a mixture of phosphoric acid monoesters, phosphoric acid diesters or their reaction products or chosen among a poly-hydrogenosiloxane, an inert silicone compound, preferably an inert silicone oil, particularly polydimethylsiloxane, and mixtures thereof or else chosen among a $C_6$-$C_{14}$-aliphatic aldehyde, preferably a $C_6$-$C_{12}$-aliphatic aldehyde, more preferentially a $C_8$-$C_9$-aliphatic aldehyde, in particular hexanal, heptanal, octanal, nonanal, decanal, undecanal dodecanal, tridecanal, butadecanal and mixtures thereof. The hydrophobising agent can also be chosen among butanoic acid, pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, lignoceric acid and combinations thereof.

In particular, the invention makes it possible to obtain a material with improved properties. Preferably, the ground and dried material (M) comprises less than 0.5% by weight, preferably less than 0.4% by weight or less than 0.2% by weight, of moisture relative to the total amount of material (M).

Also preferably, the ground, dried and treated material (M) has a hygroscopicity less than or equal to 0.26 $mg/m^2$, preferably less than or equal to 0.25 mg/m², measured according to the method described in the examples.

More preferably, the material (M) that has been ground, dried and treated with at least one hydrophobising agent has a hygroscopicity less than or equal to 0.26 mg/m², preferably less than or equal to 0.25 mg/m², measured according to the method described in the examples.

The method according to the invention makes it possible to obtain a material (M) that has reduced hygroscopicity. The use of this treated material (M) as filler in plastic polymer materials is therefore particularly advantageous. In particular, the material (M) obtained according to the invention can be used as filler in plastic polymer materials chosen among polyolefins, polyamides, halogenated polymers and polyesters.

The following examples illustrate the various aspects of the invention.

EXAMPLES

Methods for Measuring the Properties

Measurement of the Weight-Average Molecular Mass (Mw) and of the Polymoleculariy (PI) of the Polymers According to the Invention and Comparative Polymers According to the invention, the molecular weight of the copolymers is determined by Size Exclusion Chromatography (SEC), a.k.a. "Gel Permeation Chromatography" (GPC). This technique uses a Waters liquid chromatography apparatus equipped with a detector. This detector is a Waters refractive index detector. This liquid chromatography apparatus is equipped with a size exclusion column in order to separate the various molecular weights of the copolymers studied. The liquid elution phase is an aqueous phase adjusted to pH 9.00 using 1N sodium hydroxide containing 0.05 M of $NaHCO_3$, 0.1 M of $NaNO_3$, 0.02 M of triethanolamine and 0.03% of $NaN_3$.

According to a first step, the copolymer solution is diluted to 0.9% by dry weight in the dissolution solvent of the SEC, which corresponds to the liquid elution phase of the SEC to which is added 0.04% of dimethyl formamide which acts as a flow marker or internal standard. Then it is filtered using a 0.2 μm filter. Then 100 μL are injected into the chromatography apparatus (eluent: an aqueous phase adjusted to pH 9.00 by 1N sodium hydroxide containing 0.05 M of $NaHCO_3$, 0.1 of M $NaNO_3$, 0.02 M of triethanolamine and 0.03% of $NaN_3$).

The liquid chromatography apparatus has an isocratic pump (Waters 515) the flow rate of which is set to 0.8 mL/min. The chromatography apparatus also comprises an oven which itself comprises the following system of columns in series: a Waters Ultrahydrogel Guard precolumn 6 cm long and 40 mm in inner diameter and a Waters Ultrahydrogel linear column 30 cm long and 7.8 mm in inner diameter. The detection system is comprised of a Waters 410 RI refractive index detector. The oven is heated to 60° C. and the refractometer is heated to 45° C.

The chromatography apparatus is calibrated using powdered sodium polyacrylate standards of different molecular masses certified by the supplier: Polymer Standards Service or American Polymers Standards Corporation (molecular mass ranging from 900 to $2.25 \times 10^6$ g/mol and polymolecularity index ranging from 1.4 to 1.8).

Measurement of the pH

The pH is measured at 25° C. using a Mettler Toledo Seven Easy pH meter and a Mettler Toledo InLab Expert Pro pH electrode. A three-point calibration (according to the segment method) of the apparatus was first carried out using commercially-available buffer solutions with pH values of 4.7 and 10 at 25° C. (Aldrich). The pH values reported were the final values detected by the apparatus (the signal differs by less than 0.1 mV from the average over the last 6 seconds).

Measurement of the Conductivity of the Suspensions of Mineral Material

The conductivity of the suspensions is measured at 25° C. with a Mettler Toledo Seven Multi apparatus equipped with a corresponding Mettler Toledo extension and a Mettler Toledo InLab 731 conductivity probe, directly after preparation of the suspension under stirring at 1,500 rpm with a Pendraulik tooth disc stirrer. The apparatus was calibrated within the appropriate conductivity range using commercial solutions (Mettler Toledo) for conductivity calibration. The influence of the temperature on the conductivity is automatically corrected by the linear correction mode. The conductivities measured are reported for the reference temperature of 20° C. The reported conductivity values are the end point values detected by the apparatus, when the conductivity measured differs by less than 0.4% from the average conductivity for the previous 6 seconds.

Particle Size Distribution and Median Diameter by Weight of the Particles of Mineral Material The particle size distribution (% by mass of particles with a diameter below a fixed value) and the median diameter by weight ($d_{50}$) of the particles of material were determined using a known settling method. This is an analysis of the settling behaviour in a gravimetric field. The measurement was carried out at 25° C. using a Sedigraph 5100 apparatus. The measurement was carried out in an aqueous solution at 0.1% by weight of $Na_4P_2O_7$. The sample particles of mineral material are dispersed using a high-speed, ultrasound stirrer.

Measurement of the Viscosity of the Suspensions of Mineral Material

The Brookfield viscosity was measured at 25° C. and at a rotation speed of 100 rpm, using a Brookfield RVT viscometer equipped with an appropriate disk shaft 2, 3 or 4.

Measurement of the Specific Surface Area of the Ground Mineral Material

The specific surface area (m²/g) was determined using the BET method (with nitrogen as adsorbent gas) in accordance with standard ISO 9277 (2010). The total surface area (m²) of the filler material was then obtained by multiplying the surface area and the mass (g) of the corresponding sample.

Measurement of the Solids Content of the Suspensions of Mineral Material

The solids content (% by weight) is determined by dividing the mass of the solid material by the total mass of the aqueous suspension. The solids content of the solid material is determined by weighing the amount of solid material after evaporation of the aqueous phase of the suspension and then drying the material obtained until a constant mass is obtained.

Measurement of the Hygroscopicity of the Material (M) Obtained According to the Invention or the Comparative Material After exposure to an atmosphere of 10% relative humidity for 2.5 hours and at a temperature of 23±2° C., the mass of a sample of material (M) obtained according to the invention is measured using a GraviTest 6300 apparatus (Gintronic).

Then, the atmospheric humidity is increased to 85% relative humidity and the sample of material (M) is exposed to this atmosphere for 2.5 hours and at a temperature of 23±2° C. The mass of the material sample (M) is then measured again.

The mass change (mg/g of sample) is then calculated to determine the hygroscopicity of the material (M).

Similarly, the hygroscopicity of a comparative material (M) obtained using a comparative polymer is determined.
Measurement of the Moisture Content of the Materials (M) Obtained According to the Invention or the Comparative Materials A sample of material (M) obtained according to the invention (10 g) is heated to 150° C. in an oven until its mass is constant for 20 minutes. The loss of mass is determined by gravimetry and is expressed in % by weight based on the initial mass of the sample. This mass change makes it possible to determine the moisture content of the sample.

Similarly, the mass change is determined for a comparative material (M) obtained using a comparative polymer.
Preparation of Homopolymers (P) According to the Invention and of Comparative Polymers
Polymer (P1) According to the Invention The following are introduced into a synthesis reactor equipped with a mechanical stirring system and an oil bath heating system:
  654 g of water,
  8 g of sodium hypophosphite monohydrate.

The medium is heated to 95° C., then the following are added simultaneously and continuously, over 2 hours using 3 pumps:
  an aqueous solution consisting of 8.4 g of sodium persulphate and 150 g of water,
  an aqueous solution consisting of 71 g of sodium hypophosphite monohydrate and 150 g of water,
  1,017 g of acrylic acid.

Heating is continued for 1 hour at 95° C.

The polymer is then neutralised to a pH of 8.4 using sodium hydroxide at 50% by weight in water. The polymer is diluted with water in order to obtain a concentration of 42% by dry weight.

A polymer is obtained with a molecular mass Mw of 3,630 g/mol and a polymolecularity index of 2.0.
Polymer (P2) According to the Invention The following are introduced into a synthesis reactor equipped with a mechanical stirring system and an oil bath heating system:
  654 g of water,
  8 g of sodium hypophosphite monohydrate.

The medium is heated to 95° C., then the following are added simultaneously and continuously, over 2 hours using 3 pumps:
  an aqueous solution consisting of 8.4 g of sodium persulphate and 150 g of water,
  an aqueous solution consisting of 71 g of sodium hypophosphite monohydrate and 150 g of water,
  1,017 g of acrylic acid.

Heating is continued for 1 hour at 95° C.

The polymer is then treated with sodium hydroxide at 50% by weight in water to neutralise 90 mol % of the carboxylic groups. A polymer solution is obtained with a pH of 5.8.

The polymer is diluted with water in order to obtain a concentration of 42% by dry weight.

A polymer is obtained with a molecular mass Mw of 3,630 g/mol and a polymolecularity index of 2.0.
Comparative Copolymer (CP1)

The following are introduced into a synthesis reactor equipped with a mechanical stirring system and an oil bath heating system:
  241 g of water,
  0.32 g of copper sulphate pentahydrate,
  0.276 g of ferrous sulphate heptahydrate.

The medium is heated to 95° C., then the following are added simultaneously and continuously, over 2 hours:
  an aqueous solution of 3.5 g of DPTTC sodium salt (CAS number 86470-33-2) at 20.9% by weight in water, diluted in 31 g of water,
  35.3 g of hydrogen peroxide 130 V diluted in 9.4 g of water and
  279.9 g of acrylic acid diluted in 31 g of water.

Heating is continued for 1.5 hours at 95° C.

A polyacrylic acid solution is obtained with a molecular mass Mw of 6,000 g/mol and a polymolecularity index of 2.6.

The polyacrylic acid solution is treated with a solution of sodium hydroxide at 50% in water (212 g) and of $Ca(OH)_2$ (42.5 g) and water, up to pH 8.7 and a concentration of 38% by dry weight.
Preparation, Treatment and Evaluation of the Properties of Materials (M) According to the Invention and of Comparative Materials An aqueous suspension is prepared from a material (M) (natural marble from Avenza, Italy) whose measured particle size distribution is characterised by a $d_{90}$ value of 50 µm, a $d_{50}$ value of 10 µm and a $d_{20}$ value of 2 µm. The solids content of the suspension is approximately 71% by weight.

Under stirring by means of an Ystral Dispermix mixer, a polymer according to the invention or a comparative polymer is added to the suspension in an amount by dry weight of 1,500 ppm.

Then, the material (M) present in the suspension is wet ground in the presence of the polymer introduced previously. The grinding is carried out in a 200-litre vertical attrition grinder using zirconium silicate beads with a diameter of from 0.6 to 1.0 mm. The temperature of the suspension on entering the grinder is 20° C. and from 50 to 70° C. when exiting. The grinder settings are adjusted to achieve a particle size distribution of at least 46% of particles less than 2 µm in size. The polymers used and the characteristics of the suspensions are shown in Table 1.

TABLE 1

| Suspension | S1 | S2 | CS1 |
|---|---|---|---|
| Polymer | P1 | P2 | CP1 |
| Solid content (% by weight) | 71.8 | 71.7 | 71.7 |
| Viscosity (mPa.s) | 123 | 88 | 237 |
| Final particle size (% < 2 µm) | 46.2 | 46.0 | 46.7 |
| pH | 9.5 | 9.3 | 9.0 |

It can be seen that at very high solids contents (greater than 71%), the viscosities of the suspensions according to the invention are much lower than the viscosity of the comparative suspension that does not comprise a particular polymer selected according to the invention.

Then, part of the water is separated from the suspensions at a suspension temperature of 95° C. using a thermally-controlled Epcon evaporator. The suspensions are allowed to cool and the solids content, the viscosity at 25° C. and the specific surface area of the ground material are measured. The results are shown in Table 2.

TABLE 2

| Suspension | S1 | S2 | CS1 |
|---|---|---|---|
| Polymer | P1 | P2 | CP1 |
| Solid content (% by weight) | 74.6 | 74.9 | 74.5 |
| Viscosity (mPa.s) | 320 | 143 | 700 |
| Specific surface area ($m^2/g$) | 4.9 | 5.1 | 5.9 |

It can again be seen that for even higher solids contents (approximately 74.5%), the suspensions according to the invention have viscosities that are much lower than the viscosity of the comparative suspension that does not comprise a particular polymer selected according to the invention.

The suspensions are then spray-dried using a Niro (GEA) dryer set at a spraying speed of 16,680 rpm. The temperature of the burner is 400° C. The temperature of the drying tower is 130° C.

The ground and dried material (M) obtained is then treated with stearic acid as a hydrophobising agent in an amount of 1.2% by weight of stearic acid relative to the dry weight of the material (M), using a Somakon MP-LB mixer (Somakon Verfahrenstechnik). The material (M) is first stirred at 2,000 rpm and heated to 120° C., then the stearic acid is added over a period of 10 minutes while maintaining the heating and stirring. The hygroscopicity is then determined for the various materials (M) according to the invention and for the comparative materials. The results are shown in Table 3.

TABLE 3

| Suspension | S1 | S2 | CS1 |
|---|---|---|---|
| Polymer | P1 | P2 | CP1 |
| Hygroscopicity (mg/m$^2$) | 0.24 | 0.25 | 0.27 |

It can be seen that the use of a particular polymer chosen according to the invention confers improved hygroscopicity on the material (M) after drying and treatment with a hydrophobising agent compared to a ground material (M) in the presence of a comparative polymer.

The invention claimed is:

1. A method for reducing hygroscopicity of a material (M) comprising calcium carbonate, the method comprising:
    (A) preparing an aqueous suspension comprising (A1) water, (A2) the material (M), and (A3) a homopolymer (P);
    (B) wet grinding the material (M) in the aqueous suspension, to obtain a ground material (M);
    (C) partially separating the water from the aqueous suspension comprising the ground material (M);
    (D) drying the aqueous suspension of the ground material (M), to obtain dried, ground material (M); and
    (E) treating the dried, ground material (M) with a treatment agent comprising a hydrophobizing agent,
    thereby obtaining a product material (M),
    wherein the homopolymer (P) is prepared by polymerizing a compound comprising acrylic acid, an acrylic acid salt, methacrylic acid, or a methacrylic acid salt,
    wherein the homopolymer (P) has a molecular mass $M_w$, measured by SEC, in a range of
    from 3,000 to 5,000 g/mol,
    wherein the homopolymer (P) has polymolecularity index ($I_{PI}$) in a range of from 1.5 to 2.9, and
    wherein carboxylic acid groups of the homopolymer (P) are at least partially neutralized by: 70 mol % of Na$^+$; and
    from 10 to 30 mol % of cations comprising consisting of Na$^+$, K$^+$, and/or Li$^+$.

2. The method of claim 1, wherein the ground material (M) has a median particle diameter $d_{50}$ by weight, determined by settling, in a range of from 0.1 to 3 μm.

3. The method of claim 1, wherein the aqueous suspension in the preparing (A) comprises the material (M) in a range of from 40 to 78 wt. %.

4. The method of claim 1, wherein the aqueous suspension obtained after the partially separating (C) comprises at least 74 wt. % of the ground material (M), relative to a total weight of the suspension.

5. The method of claim 1, wherein the carboxylic acid groups of the homopolymer (P) are partially neutralized.

6. The method of claim 1, wherein the wet grinding (B) is carried out in the presence of the homopolymer (P) in a range of from 0.05 to 0.5 wt. %, relative to a total weight of the material (M).

7. The method of claim 1, wherein the partially separating (C) of the water from the aqueous suspension is carried out using an assistance comprising a mechanical device and/or a thermal component optionally comprising vacuum or suction.

8. The method of claim 1, wherein the ground material (M) is dried with a unit comprising a spray-dryer, a lyophilizer, a sprayer, a rotary kiln, a heating strip, an air-pulsed heater, a fluidized bed, a fluidized lyophilizer, and a nozzle-dryer.

9. The method of claim 1, wherein the hydrophobizing agent comprises:
    a carboxylic acid;
    a succinic acid anhydride derivative mono-substituted by a straight, branched or cyclic $C_2$-$C_{30}$-alkyl group;
    a reaction product of the succinic acid anhydride derivative;
    a mixture of phosphoric acid monoesters, phosphoric acid diesters, or their reaction products;
    a polyhydrogenosiloxane and/or an inert silicone compound; and/or
    a $C_6$-$C_{14}$-aliphatic aldehyde.

10. The method of claim 1, wherein the dried, ground material (M) comprises less than 0.5 wt. % of moisture, relative to a total material (M) weight.

11. The method of claim 1, wherein the product material (M) has a hygroscopicity less than or equal to 0.26 mg/m$^2$.

12. The method of claim 1, wherein the ground material (M) has a specific surface area, measured using the BET method in accordance with standard ISO 9277 (2010), in a range of from 1 to 50 m$^2$/g.

13. The method of claim 1, wherein the material (M) comprises marble, limestone, chalk, and/or dolomite.

14. The method of claim 1, wherein the ground material (M) has a median particle diameter $d_{50}$ by weight, determined by settling, in a range of from 0.6 to 2.5 μm.

15. The method of claim 1, wherein the ground material (M) has a specific surface area, measured using the BET method in accordance with standard ISO 9277 (2010), ranging from 2 to 20 m$^2$/g.

16. The method of claim 1, wherein the ground material (M) has a specific surface area, measured using the BET method in accordance with standard ISO 9277 (2010), in a range of from 3 to 10 m$^2$/g.

17. The method of claim 1, wherein the aqueous suspension obtained after the partially separating (C) comprises the ground material (M) in a range of from 74 to 83 wt. %, relative to a total weight of the suspension.

18. The method of claim 1, wherein carboxylic acid groups of the homopolymer (P) are neutralized to at least 90 mol. % by Na$^+$.

19. The method of claim 1, wherein the wet grinding (B) is carried out in the presence of the homopolymer (P) in a range of from 0.08 to 0.4 wt. %, relative to a total weight of the material (M).

* * * * *